(12) United States Patent
Kawano et al.

(10) Patent No.: US 10,050,532 B2
(45) Date of Patent: Aug. 14, 2018

(54) DC-DC CONVERTER WITH PSEUDO RIPPLE VOLTAGE GENERATION

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 15/497,706

(22) Filed: Apr. 26, 2017

(65) Prior Publication Data
US 2017/0317589 A1 Nov. 2, 2017

(30) Foreign Application Priority Data
Apr. 28, 2016 (JP) .................................. 2016-091199

(51) Int. Cl.
*H02M 3/158* (2006.01)
*H02M 1/15* (2006.01)
*H02M 3/156* (2006.01)
*H02M 1/00* (2006.01)

(52) U.S. Cl.
CPC ............. *H02M 3/158* (2013.01); *H02M 1/15* (2013.01); *H02M 3/1563* (2013.01); *H02M 2001/0032* (2013.01)

(58) Field of Classification Search
CPC ....... H02M 3/1563; H02M 2001/0032; H02M 3/158
See application file for complete search history.

(56) References Cited

U.S. PATENT DOCUMENTS

| 8,872,497 B2 | 10/2014 | Nakashima | |
| 2007/0236188 A1* | 10/2007 | Gibson | H02M 3/1563 323/225 |
| 2012/0274300 A1* | 11/2012 | Nakashima | H02M 1/14 323/284 |

* cited by examiner

*Primary Examiner* — Harry Behm
(74) *Attorney, Agent, or Firm* — Brinks Gilson & Lione (57) ABSTRACT

The DC-DC converter includes: a switching element connected between an inductor and a power supply terminal; a pseudo ripple generation circuit configured to generate a pseudo ripple voltage depending on a ripple component that is generated in the output voltage, and a smoothed voltage by smoothing the pseudo ripple voltage; a comparison circuit configured to combine a first comparison result obtained by comparing the pseudo ripple voltage and the smoothed voltage to each other, and a second comparison result obtained by comparing a reference voltage and a feedback voltage obtained by dividing the output voltage to each other, and output a comparison result signal; and an output control circuit configured to control the switching element to be turned on and off based on the comparison result signal. The comparison circuit is configured to output only the second comparison result, as the comparison result signal, when a load becomes lighter.

8 Claims, 5 Drawing Sheets

DC-DC CONVERTER WITH PSEUDO RIPPLE VOLTAGE GENERATION

RELATED APPLICATIONS

This application claims priority under 35 U.S.C. § 119 to Japanese Patent Application No. 2016-091199 filed on Apr. 28, 2016, the entire content of which is hereby incorporated by reference.

BACKGROUND OF THE INVENTION

1. Field of the Invention

The present invention relates to a DC-DC converter, and more particularly, to a hysteresis controlled (ripple controlled) DC-DC converter.

2. Description of the Related Art

In hysteresis controlled DC-DC converters, a switching element is controlled to be turned on and off with the use of a ripple component that appears in an output voltage due to the equivalent series resistance (ESR) of a capacitor connected to an output terminal.

Capacitors having a relatively large ESR have hitherto been used, but there is an increasing demand for use of ceramic capacitors because electronic devices in which DC-DC converters are used have been reduced in size. However, the ESR of the ceramic capacitors is small. Hence, when the ceramic capacitor is used, almost no ripple component appears in an output voltage and a switching element cannot be controlled to be turned on and off. As a countermeasure therefor, there has been employed a ripple injection technique in which a ripple component is generated in a pseudo manner, and the pseudo ripple component is injected to an output voltage, a comparator, or the like.

As a method for achieving the ripple injection technique, in Japanese Patent Application Laid-open No. 2012-235563, there is proposed a DC-DC converter including, as a comparator, a comparator having four inputs, that is, two differential input stages, in which a feedback voltage and a reference voltage are input to one of the two differential input stages, and a pseudo ripple voltage generated by a pseudo ripple generation circuit and a voltage obtained by smoothing the pseudo ripple voltage are input to the other of the two differential input stages.

SUMMARY OF THE INVENTION

The present invention has an object to provide a hysteresis controlled DC-DC converter employing a ripple injection technique, the DC-DC converter being capable of stably operating even when a load is light.

According to one embodiment of the present invention, there is provided a DC-DC converter including: an inductor having one end connected to an output terminal which outputs an output voltage; a first switching element connected between the other end of the inductor and a power supply terminal; a pseudo ripple generation circuit configured to generate a pseudo ripple voltage depending on a ripple component that is generated in the output voltage, and a smoothed voltage by smoothing the pseudo ripple voltage; a comparison circuit configured to combine a first comparison result obtained by comparing the pseudo ripple voltage and the smoothed voltage to each other, and a second comparison result obtained by comparing a reference voltage and a feedback voltage obtained by dividing the output voltage to each other, and output a comparison result signal; and an output control circuit configured to control the first switching element to be turned on and off based on the comparison result signal, the comparison circuit being configured to output only the second comparison result as the comparison result signal when a load becomes lighter.

According to the DC-DC converter of the present invention, when a load is light, only the second comparison result obtained by comparing the reference voltage and the feedback voltage obtained by dividing the output voltage to each other is output as the comparison result signal. Thus, the comparison result signal does not include the first comparison result obtained by comparing the pseudo ripple voltage and the smoothed voltage, which are susceptible to noise, to each other. As a result, it is possible to provide a DC-DC converter capable of suppressing the influence of noise to stably operate even when a load is light.

DETAILED DESCRIPTION OF THE PREFERRED EMBODIMENTS

Now, an embodiment of the present invention is described with reference to the drawings.

Figure 1:
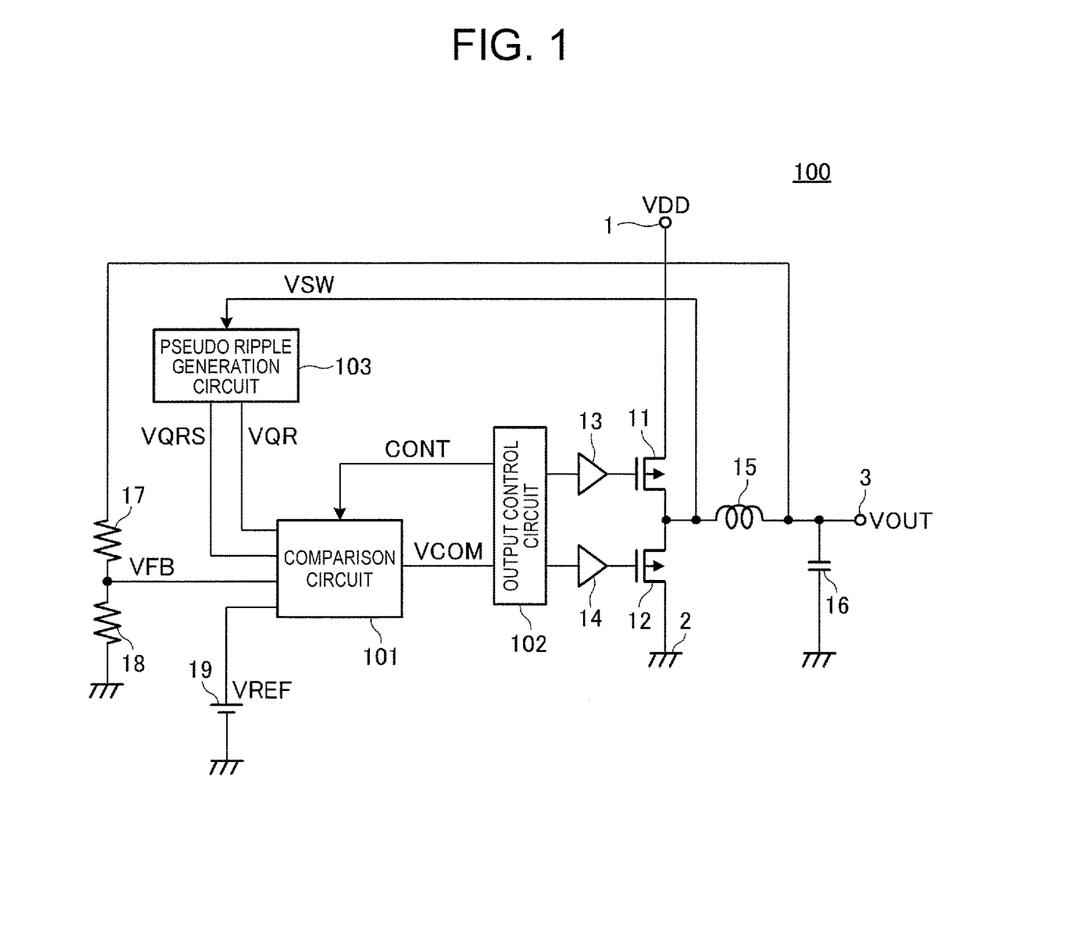
FIG. 1 is a circuit diagram of a DC-DC converter of an embodiment of the present invention.

FIG. 1 is a circuit diagram of a DC-DC converter 100 of this embodiment.

The DC-DC converter 100 of this embodiment includes a comparison circuit 101, an output control circuit 102, a pseudo ripple generation circuit 103, switching elements 11 and 12, buffers 13 and 14, an inductor 15, a capacitor 16, resistance elements 17 and 18, and a reference voltage source 19.

The switching elements 11 and 12 are connected in series between a ground terminal 2 and a power supply terminal 1 to which a power supply voltage VDD is supplied. Outputs from the buffers 13 and 14 are supplied to gates of the switching elements 11 and 12, respectively.

The inductor 15 has one end connected to the output terminal 3, and the other end connected to a node (also referred to as "switching node") between the switching elements 11 and 12. The capacitor 16 is connected between the output terminal 3 and the ground terminal 2.

The resistance elements 17 and 18 are connected in series between the output terminal 3 and the ground terminal 2, and a feedback voltage VFB is generated at a node between the resistance elements 17 and 18. The feedback voltage VFB is a divided voltage of an output voltage VOUT to be output to the output terminal 3.

The pseudo ripple generation circuit 103 generates a pseudo ripple voltage VQR depending on a ripple component that is generated in the output voltage VOUT to be output to the output terminal 3, and a smoothed voltage VQRS by smoothing the pseudo ripple voltage VQR. In this embodiment, the pseudo ripple generation circuit 103 is configured to generate the voltages VQR and VQRS based on a voltage VSW that is generated at the switching node.

The comparison circuit 101 receives the pseudo ripple voltage VQR, the smoothed voltage VQRS, the feedback voltage VFB, and a reference voltage VREF of the reference voltage source 19, and combines a first comparison result obtained by comparing the pseudo ripple voltage VQR and the smoothed voltage VQRS to each other, and a second comparison result obtained by comparing the feedback voltage VFB and the reference voltage VREF to each other. Then, the comparison circuit 101 outputs a comparison result signal VCOM.

The output control circuit 102 supplies control signals to the switching elements 11 and 12 via the buffers 13 and 14 based on the comparison result signal VCOM from the comparison circuit 101, thereby controlling the switching elements 11 and 12 to be turned on and off.

The comparison circuit 101 further receives a control signal CONT from the output control circuit 102. When a load becomes lighter, the control signal CONT enters a first state (e.g., HIGH level), and the switching element 11, which has been turned off together with the switching element 12, is turned on. That is, the control signal CONT is a signal that enters a second state (e.g., LOW level) when a load becomes heavier.

The comparison circuit 101 outputs only the second comparison result as the comparison result signal VCOM when the control signal CONT enters the first state. After that, the comparison circuit 101 combines the first comparison result and the second comparison result when the control signal CONT enters the second state, and outputs the comparison result signal VCOM.

Here, a specific configuration example of the pseudo ripple generation circuit 103 is described with reference to FIG. 2.

Figure 2:
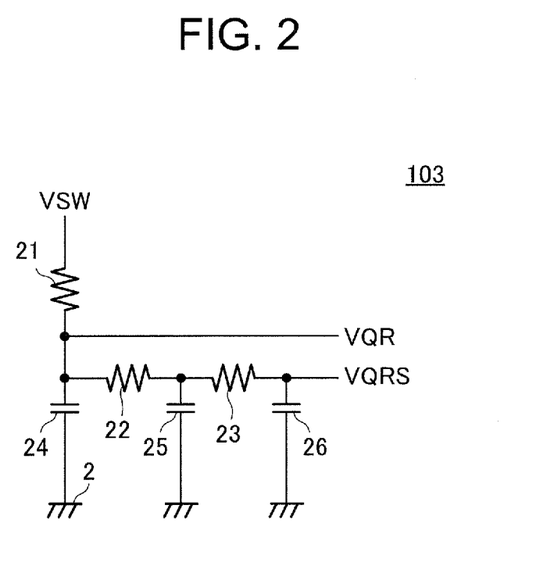
FIG. 2 is a circuit diagram for illustrating an example of a pseudo ripple circuit of the DC-DC converter of FIG. 1.

The pseudo ripple generation circuit 103 of FIG. 2 includes resistance elements 21 to 23, and capacitance elements 24 to 26. The resistance element 21 has one end for receiving the voltage VSW, and the other end connected to one end of the capacitance element 24. The other end of the capacitance element 24 is connected to the ground terminal 2.

The resistance element 22 has one end connected to a node between the resistance element 21 and the capacitance element 24, and the other end connected to one end of the capacitance element 25. The other end of the capacitance element 25 is connected to the ground terminal 2. The resistance element 23 has one end connected to the other end of the resistance element 22, and the other end connected to one end of the capacitance element 26. The other end of the capacitance element 26 is connected to the ground terminal 2.

With this configuration, the pseudo ripple voltage VQR can be obtained from the other end of the resistance element 21, and the smoothed voltage VQRS can be obtained from the other end of the resistance element 23 by smoothing the pseudo ripple voltage VQR. In this way, the pseudo ripple generation circuit 103 includes a large number of resistance elements and a large number of capacitance elements, and thus has high output impedance. Consequently, the pseudo ripple voltage VQR and the smoothed voltage VQRS are susceptible to noise.

As described above, according to the DC-DC converter 100 of this embodiment, when a load is light, the comparison result signal does not include the first comparison result obtained by comparing the pseudo ripple voltage and the smoothed voltage, which are susceptible to noise, to each other. As a result, the DC-DC converter 100 is capable of suppressing the influence of noise to operate with a stable duty ratio even when a load is light.

Figure 3:
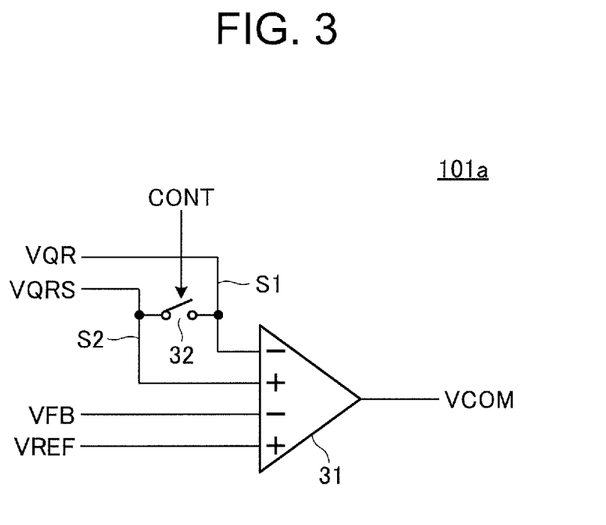
FIG. 3 is a circuit diagram for illustrating an example of a comparison circuit of the DC-DC converter of FIG. 1.

As an example of the comparison circuit 101 of the DC-DC converter 100, a comparison circuit 101a is illustrated in FIG. 3.

The comparison circuit 101a includes a comparator 31 having four inputs and a switch 32.

The comparator 31 has two differential input stages. The comparator 31 has, in one (first) differential input stage, an inverting input terminal for receiving the pseudo ripple voltage VQR, and a non-inverting input terminal for receiving the smoothed voltage VQRS, and, in the other (second) differential input stage, an inverting input terminal for receiving the feedback voltage VFB, and a non-inverting input terminal for receiving the reference voltage VREF. The comparator 31 outputs the comparison result signal VCOM.

The switch 32 is connected between a signal line S1 to which the pseudo ripple voltage VQR is supplied and a signal line S2 to which the smoothed voltage VQRS is supplied. The switch 32 is controlled to be turned on and off by the control signal CONT.

In the comparison circuit 101a having this configuration, when the control signal CONT enters the first state (HIGH level), that is, when a load becomes lighter, the switch 32 is turned on to short-circuit the signal line S1 and the signal line S2. Thus, the pseudo ripple voltage VQR and the smoothed voltage VQRS become the same potential.

Although the pseudo ripple voltage VQR and the smoothed voltage VQRS having the same potential are compared to each other in the one differential input stage of the comparator 31, the first comparison result is not substantially combined with the second comparison result because the pseudo ripple voltage VQR and the smoothed voltage VQRS have the same potential. As a result, only the second comparison result obtained by comparing the feedback voltage VFB and the reference voltage VREF to each other is output as the comparison result signal VCOM.

After that, when the control signal CONT enters the second state (LOW level), the switch 32 is turned off so that the pseudo ripple voltage VQR and the smoothed voltage VQRS may become different voltages. Then, a signal obtained by combining the first comparison result and the second comparison result is output as the comparison result signal VCOM.

Figure 4:
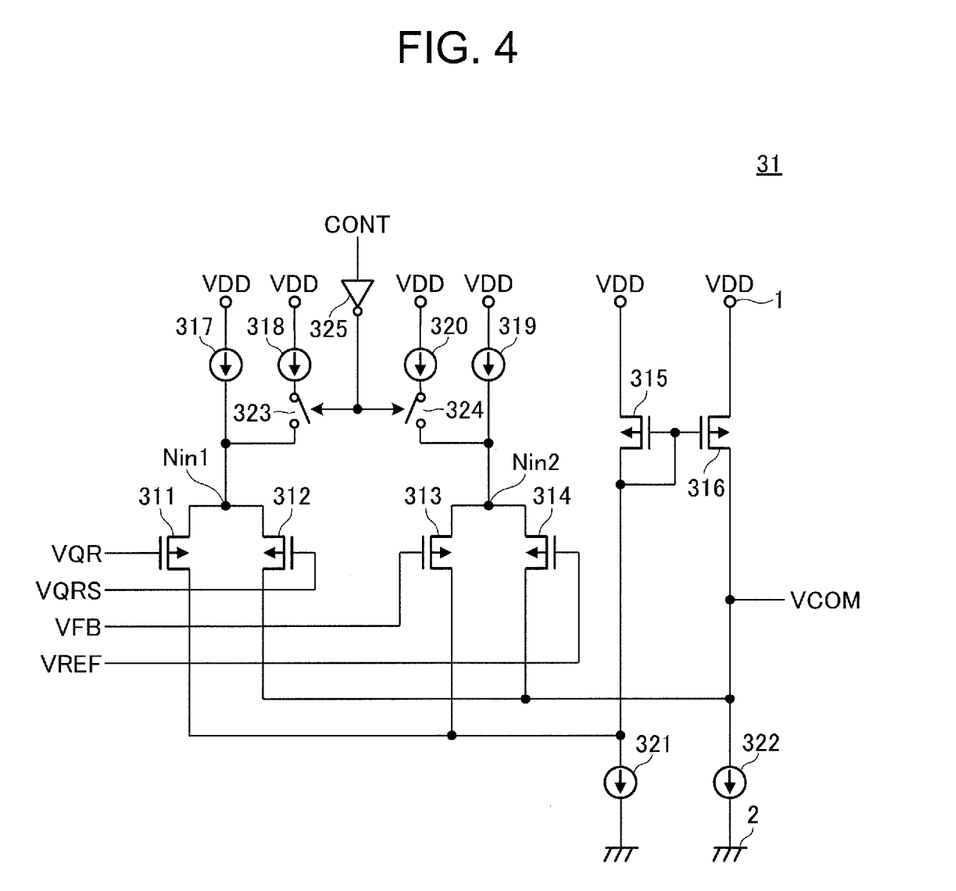
FIG. 4 is a circuit diagram for illustrating an example of a comparator of the comparison circuit of FIG. 3.

FIG. 4 is an illustration of a specific configuration example of the comparator 31 of the comparison circuit 101a described above, which is configured to operate in a low power consumption operation mode or a high speed operation mode in a switching manner depending on whether a load is light or heavy.

The comparator 31 of FIG. 4 includes PMOS transistors 311 to 316, current sources 317 to 322, switches 323 and 324, and an inverter 325.

The PMOS transistors 311 and 312 serve as the first differential input stage, and the PMOS transistors 313 and 314 serve as the second differential input stage. The pseudo ripple voltage VQR and the smoothed voltage VQRS are input to the first differential input stage, and the feedback voltage VFB and the reference voltage VREF are input to the second differential input stage.

Further, the PMOS transistor 315 and the current source 321 connected in series between the power supply terminal 1 and the ground terminal 2, and the PMOS transistor 316 and the current source 322 connected in parallel to the PMOS transistor 315 and the current source 321 serve as an output stage. Gates of the PMOS transistors 315 and 316 are connected in common, and a gate and a drain of the PMOS transistor 315 are connected in common. A drain of the PMOS transistor 315 is connected to drains of the PMOS transistors 311 and 313, and a drain of the PMOS transistor 316 is connected to drains of the PMOS transistors 312 and 314. The comparison result signal VCOM is generated at the drain of the PMOS transistor 316.

The current source 317 is connected between the power supply terminal 1 and an operating current input node Nin1 of the first differential input stage, and one end of the current source 318 is connected to the power supply terminal 1. The switch 323 is connected between the other end of the current source 318 and the operating current input node Nin1, and is controlled to be turned on and off by a signal obtained by inverting the control signal CONT by the inverter 325.

The current source 319 is connected between the power supply terminal 1 and an operating current input node Nin2 of the second differential input stage, and one end of the current source 320 is connected to the power supply terminal 1. The switch 324 is connected between the other end of the current source 320 and the operating current input node Nin2, and is controlled to be turned on and off by a signal obtained by inverting the control signal CONT by the inverter 325.

When a load becomes lighter, that is, when the control signal CONT enters the first state (HIGH level), as described above, the switch 32 illustrated in FIG. 3 is turned on to short-circuit the signal line S1 and the signal line S2, and the switches 323 and 324 are both turned off by an inverted signal of the control signal CONT in the first state (HIGH level). As a result, an operating current is supplied to the operating current input node Nin1 of the first differential input stage only from the current source 317, and an operating current is supplied to the operating current input node Nin2 of the second differential input stage only from the current source 319. Thus, when a load is light, the comparator 31 can operate in the low power consumption operation mode with suppressed power consumption.

Further, in switching off the switch 323, coupling noise is transferred to the pseudo ripple voltage VQR and the smoothed voltage VQRS through the parasitic capacitance of the first differential input stage, but at this time, the switch 32 illustrated in FIG. 3 is turned on to short-circuit the signal line S1 and the signal line S2. Thus, the pseudo ripple voltage VQR and the smoothed voltage VQRS become the same potential, and the comparator 31 can be prevented from malfunctioning due to the influence of the coupling noise.

Meanwhile, when a load becomes heavier, that is, when the control signal CONT enters the second state (LOW level), the switch 32 illustrated in FIG. 3 is turned off, and the switches 323 and 324 are both turned on by an inverted signal of the control signal CONT in the second state (LOW level). As a result, an operating current is supplied to the operating current input node Nin1 of the first differential input stage from the two current sources 317 and 318, and an operating current is supplied to the operating current input node Nin2 of the second differential input stage from the two current sources 319 and 320. Thus, when a load is heavy, the comparator 31 can operate in the high speed operation mode.

Figure 5:
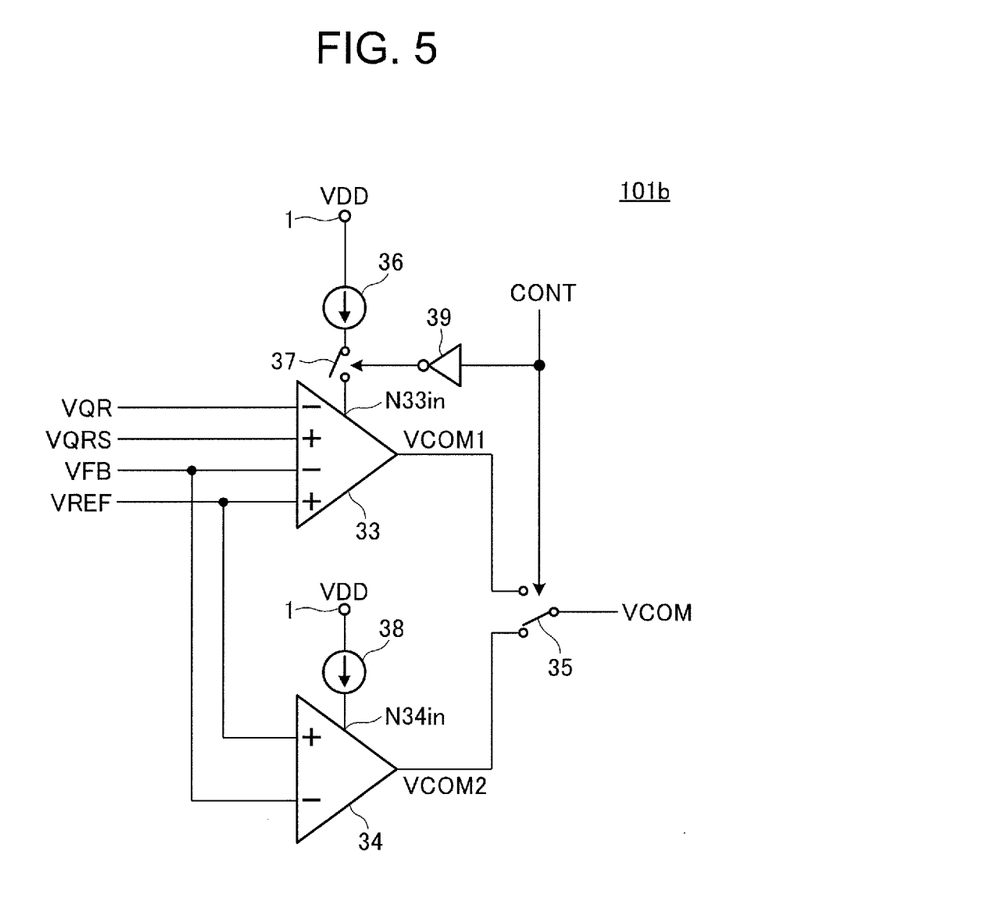
FIG. 5 is a circuit diagram for illustrating another example of the comparison circuit of the DC-DC converter of FIG. 1.

As another example of the comparison circuit 101 of the DC-DC converter 100, a comparison circuit 101b is illustrated in FIG. 5.

The comparison circuit 101b includes comparators 33 and 34, and a switch 35. The comparison circuit 101b further includes a current source 36 and a switch 37 connected in series between the power supply terminal 1 and an operating current input node N33in of the comparator 33, and a current source 38 connected between the power supply terminal 1 and an operating current input node N34in of the comparator 34. The switch 37 is controlled to be turned on and off by a signal obtained by inverting the control signal CONT by an inverter 39.

The comparator 33 is a comparator having four inputs, that is, two differential input stages. The comparator 33 has, in one (first) differential input stage, an inverting input terminal for receiving the pseudo ripple voltage VQR, and a non-inverting input terminal for receiving the smoothed voltage VQRS, and, in the other (second) differential input stage, an inverting input terminal for receiving the feedback voltage VFB, and a non-inverting input terminal for receiving the reference voltage VREF. The comparator 33 combines a result of comparison between the pseudo ripple voltage VQR and the smoothed voltage VQRS, and a result of comparison between the feedback voltage VFB and the reference voltage VREF, and outputs a comparison signal VCOM1 (a signal corresponding to the above-mentioned signal obtained by combining the first comparison result and the second comparison result).

The comparator 34 is a comparator having two inputs, that is, one differential input stage. The comparator 34 has, in the differential input stage, an inverting input terminal for receiving the feedback voltage VFB, and a non-inverting input terminal for receiving the reference voltage VREF. The comparator 34 compares the feedback voltage VFB and the reference voltage VREF to each other, and outputs a comparison signal VCOM2 (a signal corresponding to the above-mentioned second comparison result).

The switch 35 is configured to choose output from the comparator 34 when the control signal CONT is in the first state (HIGH level), and choose output from the comparator 33 when the control signal CONT is in the second state (LOW level).

In the comparison circuit 101b having this configuration, when the control signal CONT enters the first state (HIGH level), that is, when a load becomes lighter, the switch 35 chooses the comparison signal VCOM2 being output from the comparator 34, and the comparison circuit 101b outputs the comparison signal VCOM2 as the comparison result signal VCOM.

After that, when the control signal CONT enters the second state (LOW level), the switch 35 chooses the comparison signal VCOM1 being output from the comparator 33, and the comparison circuit 101b outputs the comparison signal VCOM1 as the comparison result signal VCOM.

In addition, in the comparison circuit 101b, a current value of the current source 36, which corresponds to an operating current of the comparator 33, is set to be larger than a current value of the current source 38, which corresponds to an operating current of the comparator 34. Further, when a load becomes lighter, that is, when the control signal CONT enters the first state (HIGH level), the switch 37 is turned off by an inverted signal of the control signal CONT, with the result that no operating current is supplied to the comparator 33. As a result, the comparison circuit 101b can operate in the low power consumption operation mode when the control signal CONT is in the first state (HIGH level), and operate in the high speed operation mode when the control signal CONT is in the second state (LOW level) in a switching manner.

The embodiment of the present invention has been described above, but the present invention is not limited to the above-mentioned embodiment, and it is to be understood that various modifications can be made thereto without departing from the gist of the present invention.

For example, in the above-mentioned embodiment, the example in which the present invention is applied to an ordinary hysteresis controlled DC-DC converter is described, but needless to say, the present invention is also applicable to a constant on-time (COT) controlled DC-DC converter, which is one of hysteresis controlled DC-DC converters.

Further, in the above-mentioned embodiment, as a method of generating the pseudo ripple voltage VQR depending on a ripple component that is generated in the output voltage VOUT, and the smoothed voltage VQRS by smoothing the pseudo ripple voltage VQR, the example in which the voltages VQR and VQRS are generated based on the voltage VSW that is generated at the switching node is described. However, the present invention is not limited thereto, and the voltages VQR and VQRS may be generated based on a gate voltage of the switching element 11, for example.

Further, in the description of the above-mentioned embodiment, in order to simplify the description, a state in which the switching element 11, which has been turned off together with the switching element 12, is turned on is referred to as "a load becomes heavier", and when a load becomes heavier, the switch 32 of FIG. 3 is turned off, the switches 323 and 324 of FIG. 4 are turned on, and the switch 37 of FIG. 5 is turned on. However, the present invention also includes a configuration in which each switch is turned on and off as described above when a load is light, and the switching element 11, which has been turned off together with the switching element 12, is turned on.

What is claimed is:

1. A DC-DC converter, comprising:
   an inductor having a first end connected to an output terminal that outputs an output voltage;
   a first switching element connected between a second end of the inductor and a power supply terminal;
   a pseudo ripple generation circuit configured to generate a pseudo ripple voltage depending on a ripple component that is generated in the output voltage, and a smoothed voltage by smoothing the pseudo ripple voltage;
   a comparison circuit configured to combine a first comparison result obtained by comparing the pseudo ripple voltage and the smoothed voltage, and a second comparison result obtained by comparing a reference voltage and a feedback voltage obtained by dividing the output voltage, and to output a comparison result signal; and
   an output control circuit configured to control the first switching element to turn on and turn off based on the comparison result signal,
   the comparison circuit further configured to receive a control signal from the output control circuit, wherein the pseudo ripple voltage and the smoothed voltage are connected by a switch to have a same potential upon a light load condition, such that the comparison circuit outputs only the second comparison result as the comparison result signal upon the light load condition.

2. A DC-DC converter according to claim 1, wherein the comparison circuit comprises a comparator having four inputs, the comparator comprising a first inverting input terminal for receiving the pseudo ripple voltage, a first non-inverting input terminal for receiving the smoothed voltage, a second inverting input terminal for receiving the feedback voltage, and a second non-inverting input terminal for receiving the reference voltage.

3. A DC-DC converter according to claim 2,
   wherein the comparator further comprises a first differential input stage for receiving the pseudo ripple voltage and the smoothed voltage, a second differential input stage for receiving the feedback voltage and the reference voltage, a first current source and a second current source that are configured to supply current to a first operating current input node in the first differential input stage, and a third current source and a fourth current source that are configured to supply current to a second operating current input node in the second differential input stage, and
   wherein upon the light load condition, current supply from the second current source to the first operating current input node and current supply from the fourth current source to the second operating current input node are stopped.

4. A DC-DC converter according to claim 1, further comprising a second switching element connected in series to the first switching element,
   wherein the output control circuit is configured to control the second switching element to be turned on and off, and
   wherein upon the light load condition, the comparison circuit combines the first comparison result and the second comparison result and outputs the comparison result signal when the first switching element, which has been turned off together with the second switching element, is turned on.

5. A DC-DC converter according to claim 1,
   wherein the comparison circuit comprises:
      a first comparator having four inputs, the first comparator comprising a first inverting input terminal for receiving the pseudo ripple voltage, a first non-inverting input terminal for receiving the smoothed voltage, a second inverting input terminal for receiving the feedback voltage, and a second non-inverting input terminal for receiving the reference voltage, the first comparator being configured to output a first comparison signal; and
      a second comparator having two inputs, the second comparator comprising an inverting input terminal for receiving the feedback voltage, and a non-inverting input terminal for receiving the reference voltage, the second comparator being configured to output a second comparison signal, and
   wherein the comparison circuit is configured to output the second comparison signal as the comparison result signal upon the light load condition.

6. A DC-DC converter according to claim 5, wherein the first comparator has an operating current that is larger than an operating current of the second comparator.

7. A DC-DC converter according to claim 6, wherein supply of the operating current to the first comparator is stopped upon the light load condition.

8. A DC-DC converter according to claim 5, further comprising a second switching element connected in series to the first switching element,
   wherein the output control circuit is configured to control the second switching element to be turned on and off, and
   wherein upon the light load condition, the comparison circuit outputs the first comparison signal as the comparison result signal when the first switching element, which has been turned off together with the second switching element, is turned on.

* * * * *